Dec. 12, 1950     B. BETTER ET AL     2,533,758
FLOATING HOLDER
Filed July 9, 1949
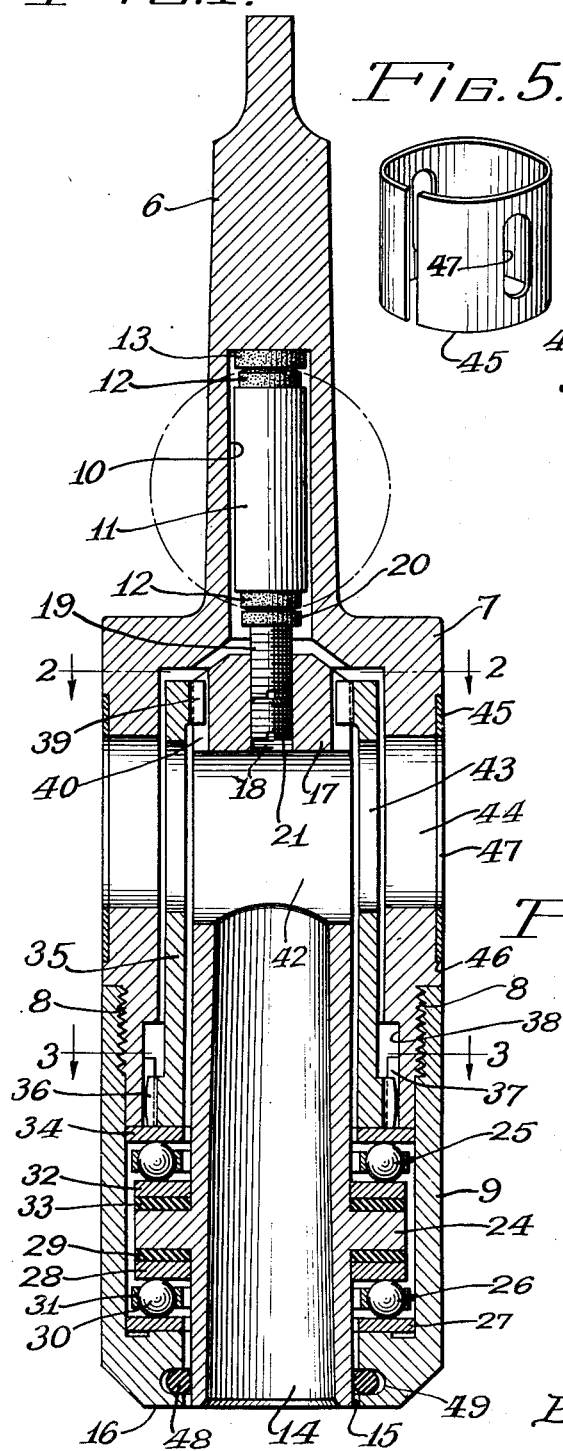
Inventors:
Bernard Better
John W. Lehde, Jr.
By Glenn S. Noble
Atty.

Patented Dec. 12, 1950

2,533,758

UNITED STATES PATENT OFFICE 2,533,758

FLOATING HOLDER

Bernard Better and John W. Lehde, Jr., Chicago, Ill., assignors to Scully-Jones & Company, Chicago, Ill., a corporation of Illinois Application July 9, 1949, Serial No. 103,928

14 Claims. (Cl. 279—16)

1

This invention relates to floating holders adapted for use with various machine tools for performing operations such as drilling, reaming, tapping, or the like. It is difficult, if not impractical, to make such machines in which the spindle is in exact alignment with the hole or part in the work piece which is to be operated upon. When there is lateral deflection of the axis of the spindle and the hole in the work or when the machine spindle is slightly out of true center, the tool, for instance, a reamer, will make an irregularly shaped hole with consequent strain on the mechanism and possible imperfect work causing unnecessary scrap. Floating holders are in more or less common use, but such floating holders are subject to various objections.

The present invention is an improvement in floating holders whereby they will give improved operating efficiency.

The objects of this invention are to provide an improved floating holder for machine tools which will permit the axis of the tool to coincide with the axis of the hole in the work whereby the cutting tool will operate more efficiently, to provide a device of the character set forth in which friction is reduced to a minimum and in which the various parts will be subjected to comparatively little wear and in general, to provide such an improved device as will be described more fully hereinafter in connection with the accompanying drawings in which, Fig. 1 is a longitudinal sectional view of a holder embodying our invention;

Fig. 2 is a sectional view taken on the line 2—2 of Fig. 1;

Fig. 3 is a sectional view taken on the line 3—3 of Fig. 1;

Fig. 4 is a diagrammatic sectional view illustrating the operation of the holder; and Fig. 5 is a perspective view of the spline hole cover.

The particular form of holder shown in these drawings has a shank 6 for engagement with the spindle of the machine tool and has a cylindrical or cup-shaped extension 7 which is threaded at 8 for receiving a cap or collar 9. The shank 6 has an axial hole 10 for receiving a ball thrust pin 11 which is slidably mounted therein and which is provided at its ends with tips 12 formed of hard wear resisting material such as carbide or Carboloy. The outer surfaces of these tips are spherically ground as indicated. A disc or pad 13 also formed of similar wear resisting material is provided at the bottom of the hole 10. The holder has a collet 14 which extends substantially the full length of the cup 7 and cap 9 and extends out through an opening 15 in the end 16 of the cap and is adapted to hold any tool to be used with the holder. The collet is closed or solid at its inner end as shown at 17 and has a hole 18 which is threaded to receive a threaded thrust screw 19 with its head 20 formed of hard wear resisting material to coact with the disc 13 on the end of the ball thrust pin 11. A set screw 21 also engages with the threaded hole 18 and serves to lock the thrust screw in position.

The collet 14 is mounted in the holder on any suitable anti-friction bearings. In the present instance, it has an integrally formed annular flange 24 which is mounted between ball bearings 25 and 26. The bearing 26 has a lower race member or washer 27 which engages with the flange or end 16 and also has a similar race member 28 which engages with a washer 29 bearing against the flange 24. This washer may be made of any suitable material, preferably being made of steel when used as a parallel float only, but may be made of rubber or other resilient material when provided for a parallel and angular or universal float. The balls 30 which are interposed between the races are mounted in any suitable cage 31.

The ball bearing 25 has a bearing race 32 which engages with a washer 33 on the upper face of the flange 24. This washer may also be made of any suitable material such as steel or rubber. This bearing also has an upper ball race 34 which engages with the lower end of the cup 7. By means of this arrangement, the collet is held in the shank or holder against longitudinal movement while having a limited lateral movement on the anti-friction bearings.

The means for driving the collet forms one of the most important features of this invention. For this purpose, we provide a cylindrical driving member or collet drive 35 which is mounted between the inner end portion of the collet and the cup or enlarged portion of the shank with its outer or lower end resting freely on the bearing race 34. The lower end of the drive 35 has outwardly projecting peripheral gear teeth 36 which mesh with coacting internal gear teeth 37 which project inwardly at the lower end of the cup 7, the lower portion of the hole or opening 38 in the cup being enlarged to accommodate such intermeshing gear teeth. The teeth 36 are preferably ground spherically to permit limited rocking movement between the drive and the cup. The upper end of the drive 35 has inwardly projecting gear teeth 39 which mesh with gear teeth 40 extending outwardly from the upper end of the collet 14. These teeth on the collet are also preferably ground spherically to permit rocking movement between the collet and the drive.

The operation of our floating holder may be readily seen from Fig. 4. The axis of the shank 6 as shown as being off-set or out of alignment with the axis of the collet or tool holder 14 which carries the tool 41. Assuming that the tool is in engagement with the hole in a work piece, it will be properly driven with its axis out of alignment with the shank, the drive 35 being driven by the gears 36 and 37 and the collet 19 being in turn driven by means of the gears 39 and 40. The curved or spherical surface of the teeth 36 and 40 serving to permit universal movement whereby the driving connection acts in the nature of the universal joint between the shank and the driven tool. It will, of course, be understood that there will be sufficient play between the intermeshing gears to permit such universal movement.

The thrust due to the pressure on the tool will be taken up directly by the ball thrust pin 11, the ends of which are spherical or rounded, thus permitting any necessary rocking or lateral movement of the collet. The collet is preferably held closely against the bearings and may be adjusted by means of the adjusting screw 19. By means of this arrangement, it will be seen that the pressure necessary to hold the tool or force the same into the work piece will be exerted through the thrust members and will not be carried by the driving mechanism or universal joint, which will therefore act freely without unnecessary binding or friction. The collet 14 is preferably provided with the usual transverse knock-out opening 42 to which access is obtained through opening 43 in the drive and opening 44 in the cup. A split cylindrical cover 45 is mounted in an annular recess 46 in the outer wall of the cup 7 and has oppositely disposed openings 47 which will register with the knock-out or spline openings for removing a tool from the collet.

A packing ring 48 is mounted in a groove 49 in the inner wall of the cap 9 and fits closely against the end of the collet 14, the groove being sufficiently deep to permit lateral movement of the collet. The spline hole cover together with the sealing ring serve effectively to prevent dirt, chips, or the like, from entering the holder. Such chips or dirt might otherwise tend to interfere with the successful operation of the device.

From this description, it will be seen that we provide a floating holder which will perform in a particularly efficient manner and which avoids various of the objections to the holders heretofore used.

Having thus described our invention, we claim:

1. A floating holder consisting of a cylindrical driving member, a cylindrical driven tool holding member mounted in the driving member, universal joint connections between the driving member and the driven member, consisting of a cylindrical drive coupling interposed between the driving member and the driven member having external gear teeth at its lower end that engage with internal gear teeth on the driving member and having internal gear teeth at its opposite end engaging with external gear teeth on the driven member, said gear teeth in both sets of gears always remaining in full engagement and means coacting with the driving member and the driven member for exerting pressure on the driven member independently of the driving means 2. In a floating holder, the combination of a shank having a cylindrical projection, a collet, anti-friction means for supporting the collet in the cylindrical projection and permitting lateral movement of the collet in the projection, a driver, gears coacting with the cylindrical member and one end of the driver for turning the driver, and gears coacting with the opposite end of the driver and the collet for turning the collet.

3. A device, as per claim 2, in which one gear of each set is spherically ground to permit relative rocking movement between the coacting gears.

4. In a floating holder, the combination of a shank having a cup-shaped projection at one end thereof, a cap engaging with the cup, a collet extending through the cup and cap and having an annular flange, anti-friction bearings between the flange and the cap and between the flange and the cup for holding the collet against longitudinal movement while permitting lateral movement thereof, a cylindrical driver interposed between the collet and the cup, internal gear teeth at the end of the cup, gear teeth on the driver engaging with said gear teeth and having longitudinally curved faces to permit rocking movement of the driver, internal teeth on the opposite end of the driver, and teeth on the collet engaging with said last named teeth with their faces curved longitudinally to permit rocking movement of the collet.

5. In a device of the character set forth, the combination of a driving member adapted to be used in a machine tool, a tool holding driven member mounted in the driving member, universal joint means between the driving member and the tool holding member for driving the tool holding member, and independent means coacting with the driving member and the tool holding member for exerting pressure on the tool holding member.

6. A device as per claim 5, in which one of the pressure members consists of a ball thrust pin with spherically ground tips formed of hard wearing material.

7. In a floating tool holder, the combination of a shank having a cylindrical extension, a collar secured to the extension, a collet mounted in the cylindrical extension said collet having an annular flange within the collar, a ball bearing between said flange and the collar, a ball bearing between the flange and the extension, a cylindrical driver mounted in the extension and fitting over the collet, driving gears between the extension and one end of the driver, and driving gears between the other end of the driver and the collet, the arrangement being such that the collet may be driven with its longitudinal axis out of alignment with the axis of the shank.

8. A floating holder including a housing, a collet mounted in the housing and having a spline hole, and an adjustable cover on the housing for covering said hole.

9. The combination with a floating holder having a cap portion and a collet mounted therein and having a transverse knock-out opening, of a cylindrical cover fitting over the cap portion and having openings adapted to register at times with said knock-out opening.

10. A device as per claim 5, having sealing means between the driving member and the tool holding member to prevent dirt or the like from entering between said members.

11. A floating tool holder including a housing, a collet movably mounted in the housing, and a sealing ring between the outer periphery of the collet and the adjacent end portion of the housing.

12. In a floating holder, the combination of a shank having a cylindrical extension, a cap secured to said extension, a collet mounted in the extension and extending to the end of the cap, said cap having a peripheral groove around the collet adjacent to the end, and a ring of resilient material mounted in said groove and engaging with the collet to make a tight closure therebetween.

13. In a floating tool holder, the combination of a cylindrical driving member, a driven collet rotatably mounted in the driving member and adapted to receive and hold the tool, there being a space between the driving member and the collet, a cylindrical drive coupling interposed in said space, a gear on the lower end of the driving member engaging with a gear on the lower end of the drive coupling, and a gear on the upper end of the drive coupling which engages with a gear on the upper end of the collet, the arrangement being that said pairs of gears will remain in full engagement whereby the collet will be driven by teeth which remain in engagement on opposite sides of the driven member.

14. A floating tool holder consisting of a cylindrical member, a collet mounted in the cylindrical member, means for holding the collet against longitudinal movement in the cylindrical member but permitting limited lateral movement thereof, a coupling member between the cylindrical member and the collet and gears between the coupling member and the cylindrical member and between the coupling member and the collet, the arrangement being such that the coupling member will permit limited lateral movement of the collet.

BERNARD BETTER.
JOHN W. LEHDE, Jr.

REFERENCES CITED

The following references are of record in the file of this patent:

UNITED STATES PATENTS

| Number | Name | Date |
|---|---|---|
| 739,537 | Francis | Sept. 22, 1903 |
| 943,616 | Holub | Dec. 14, 1909 |
| 1,089,181 | Apple | Mar. 3, 1914 |
| 1,129,491 | Housel | Feb. 23, 1915 |
| 2,118,435 | Brown | May 24, 1938 |
| 2,369,321 | Stalker | Feb. 13, 1945 |

FOREIGN PATENTS

| Number | Country | Date |
|---|---|---|
| 552,700 | Germany | June 2, 1932 |